(12) United States Patent
Chiang (10) Patent No.: US 9,360,151 B2
(45) Date of Patent: Jun. 7, 2016

(54) ADJUSTABLE SUPPORTING DEVICE

(71) Applicant: Wistron Corporation, New Taipei (TW)

(72) Inventor: Chun-Yi Chiang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 158 days.

(21) Appl. No.: 13/798,178

(22) Filed: Mar. 13, 2013

(65) Prior Publication Data

US 2013/0320160 A1 Dec. 5, 2013

(30) Foreign Application Priority Data

Jun. 5, 2012 (TW) .............................. 101120122 A (51) Int. Cl.
*F16M 11/10* (2006.01)
*F16M 11/20* (2006.01)
*F16M 11/04* (2006.01)

(52) U.S. Cl.
CPC ......... *F16M 11/2021* (2013.01); *F16M 11/046* (2013.01); *F16M 11/10* (2013.01); *F16M 2200/022* (2013.01); *F16M 2200/024* (2013.01); *F16M 2200/044* (2013.01)

(58) Field of Classification Search
USPC .............. 248/149, 150, 371, 372.1, 397, 393, 248/161, 162.1, 919, 921, 922, 923, 123.11, 248/123.2; 16/366, 368, 369, 371, 374–377
See application file for complete search history.

(56) References Cited

U.S. PATENT DOCUMENTS

| 5,333,356 | A | * | 8/1994 | Katagiri | .......................... | 16/340 |
| 8,011,632 | B2 | * | 9/2011 | Wang et al. | ................ | 248/284.1 |
| 8,220,767 | B2 | | 7/2012 | Lin | | |
| 8,763,969 | B2 | * | 7/2014 | Wu et al. | .................... | 248/284.1 |

(Continued)

FOREIGN PATENT DOCUMENTS

| TW | M348458 | 1/2009 |
| TW | M393608 | 12/2010 |

OTHER PUBLICATIONS

Office action mailed on Apr. 14, 2014 for the Taiwan application No. 101120122, filing date: Jun. 5, 2012, p. 1 line 13-14, p. 2-3 and p. 4 line 1-5.

(Continued)

*Primary Examiner* — Alfred J Wujciak
(74) *Attorney, Agent, or Firm* — Winston Hsu; Scott Margo (57) ABSTRACT

An adjustable supporting device includes a pivotal connection device and two supporting members individually pivotally connected to the pivotal connection device. The pivotal connection device includes a rotational restriction mechanism including a driving part and a restricting part connected to the driving part. The restricting part is capable of being driven by the driving part so as to move relative to the supporting members. Therein, the restricting part is capable of entering limitation ranges of rotational restriction structures of the supporting members simultaneously for individually limiting rotation ranges of the supporting members relative to the pivotal connection device according to the rotational restriction structures. Therefore, by designing the above rotation ranges, the adjustable supporting device can avoid damage to a user due to an unexpected folding of the supporting members, before the restricting part entirely departs from the limitation ranges of the rotation ranges of the supporting members.

19 Claims, 11 Drawing Sheets

(56) References Cited

U.S. PATENT DOCUMENTS

| | | | |
|---|---|---|---|
| 2006/0054751 A1* | 3/2006 | Johnson et al. | 248/123.11 |
| 2007/0021695 A1* | 1/2007 | Wu | 601/99 |
| 2007/0029457 A1* | 2/2007 | Baek | 248/372.1 |
| 2007/0262224 A1* | 11/2007 | Cheng | 248/423 |
| 2008/0192417 A1* | 8/2008 | Hwang et al. | 361/681 |
| 2008/0302926 A1* | 12/2008 | Cheng et al. | 248/161 |
| 2009/0013500 A1* | 1/2009 | Ueyama et al. | 16/354 |
| 2009/0282647 A1* | 11/2009 | Kim et al. | 16/274 |
| 2013/0318746 A1* | 12/2013 | Kuramochi | 16/342 |
| 2014/0252180 A1* | 9/2014 | Mau et al. | 248/123.11 |

OTHER PUBLICATIONS

Office action mailed on Sep. 10, 2014 for the Taiwan application No. 101120122, filing date: Jun. 5, 2012, p. 2 line 4-26, p. 3 and p. 4 line 1-13.

Office action mailed on Jan. 12, 2015 for the China application No. 201210204612.3, p. 3 line 4-31, p. 4 and p. 5 line 1-26.

* cited by examiner

ADJUSTABLE SUPPORTING DEVICE

BACKGROUND OF THE INVENTION

1. Field of the Invention

The invention relates to an adjustable supporting device, and especially relates to an adjustable supporting device capable of being folded.

2. Description of the Prior Art

Many devices are fixed or placed on other objects by use of supporting devices. For example, a monitor is fixed on a supporting device and then is placed on a table. For use convenience of a user, the supporting device is designed to be adjustable in height and angle. In practice, also for storage convenience, the supporting device usually consists of a plurality of pivotally-connected supports. In use, the user can expand the supports till a required height and angle therefor is obtained, so that the monitor thereon can fill the user's requirement. In storage, for storage convenience, the user can shrink or fold the supports to reduce required space for storage as small as possible. For convenient adjustment to the expanded status of the supports for the user, there is usually no limitation on relative rotation of any adjacent two of the supports. However, when the user adjusts the expanded status of the supports (mainly to rotate the supports), it is very probable to incautiously clamp fingers of the user by the supports due to an unexpected folding induced by an improper rotation operation. Furthermore, when the user needs to perform the adjustment operation by a single hand for some reason, an improper rotation occurs more easily. For this issue, an adjustable supporting device having a positioning function by use of a washer set at its pivotal connection is available, but the washer set performs the positioning function only by use of interference structure and compact assembly to increase friction force for resisting an improper rotation by the user, which cannot avoid the improper rotation exactly. Therefore, the abovementioned adjustable supporting device cannot avoid the unexpected folding effectively, so it is unavoidable that damage due to an unexpected folding induced by an improper rotation operation.

SUMMARY OF THE INVENTION

An objective of the invention is to provide an adjustable supporting device, which is designed to be with restriction mechanisms applied to pivotal connections, so as to exactly realize the avoidance of unexpected rotations.

An adjustable supporting device of the invention includes a pivotal connection device, a first supporting member, and a second supporting member. The pivotal connection device includes a main body and a rotational restriction mechanism. The rotational restriction mechanism is disposed on the main body and includes a driving part and a restricting part. The restricting part is connected to the driving part and capable of being driven by the driving part to move relative to the main body. The first supporting member is pivotally connected to the main body and includes a first rotational restriction structure corresponding to the restricting part. The second supporting member is pivotally connected to the main body and includes a second rotational restriction structure corresponding to the restricting part. Therein, the restricting part is capable of simultaneously entering limitation ranges of the first rotational restriction structure and the second rotational restriction structure so as to limit rotation of the first supporting member and the second supporting member relative to the pivotal connection device. In other words, when the restricting part enters the limitation ranges of the first rotational restriction structure and the second rotational restriction structure, the first supporting member and the second supporting member can only rotate relative to the pivotal connection device according to the first rotational restriction structure and the second rotational restriction structure. Therefore, by the design of the rotational restriction, before the restricting part entirely departs from the limitation ranges of the first rotational restriction structure and the second rotational restriction structure, the adjustable supporting device can effectively avoid unexpectedly rotating of the first supporting member and the second supporting member and can avoid possible damage to a user due to an unexpected folding of the first supporting member and the second supporting member.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
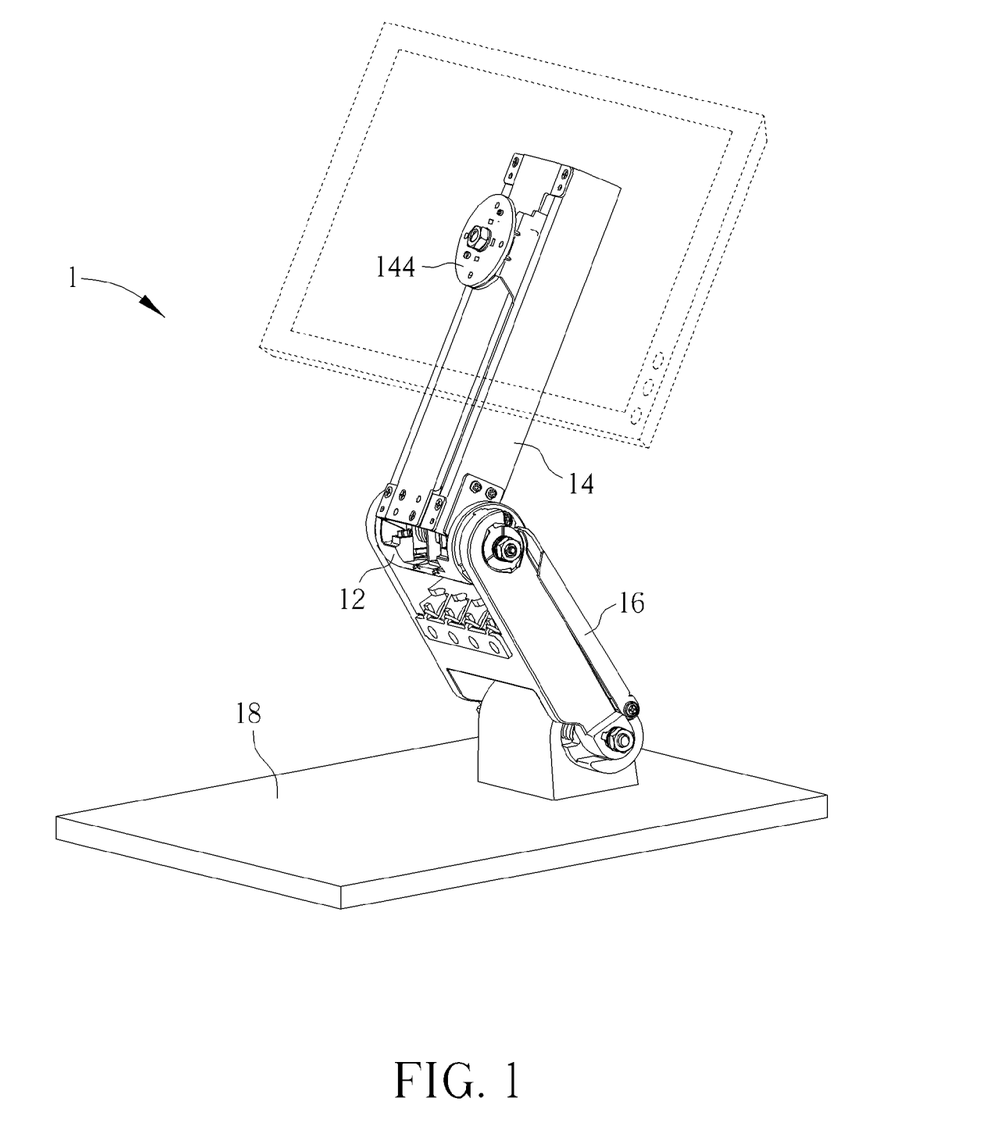
FIG. 1 is a schematic diagram illustrating an adjustable supporting device of a preferred embodiment according to the invention.

Please refer to FIG. 1, which is a schematic diagram illustrating an adjustable supporting device 1 of a preferred embodiment according to the invention. The adjustable supporting device 1 includes a pivotal connection device 12, a first supporting member 14, a second supporting member 16, and a mount 18. The first supporting member 14 and the second supporting member 16 are connected by the pivotal connection device 12. The second supporting member 16 is also pivotally connected to the mount 18. An object (such as a monitor, shown by dashed lines in FIG. 1) can be mounted on the first supporting member 14. Thereby, a user can place the mount 18 on a table and then rotate the first supporting member 14 and the second supporting member 16 for a required height and angle of disposition of the monitor.

Figure 2:
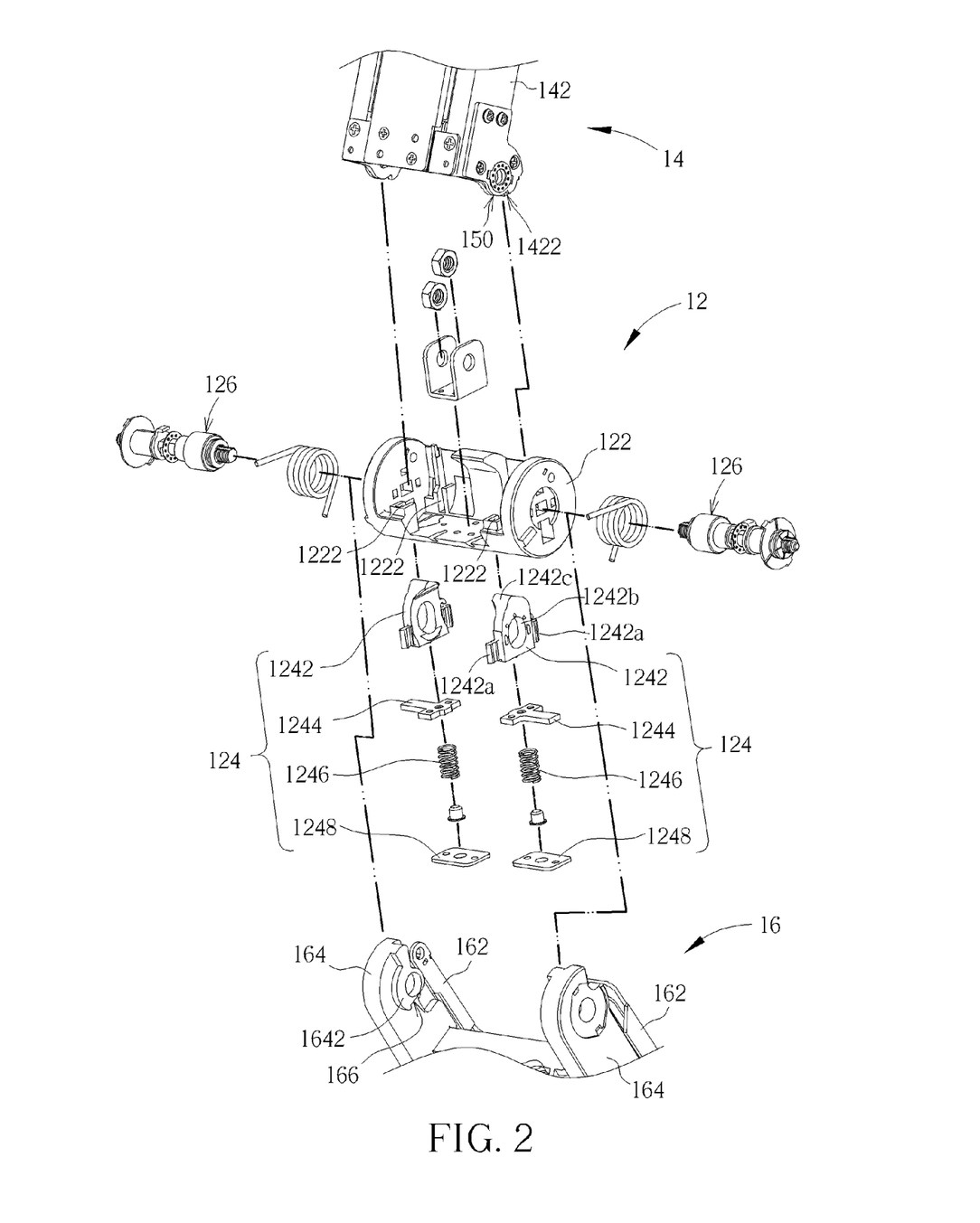
FIG. 2 is a partially-exploded view of a pivotal connection device of the adjustable supporting device in FIG. 1.
Figure 3:
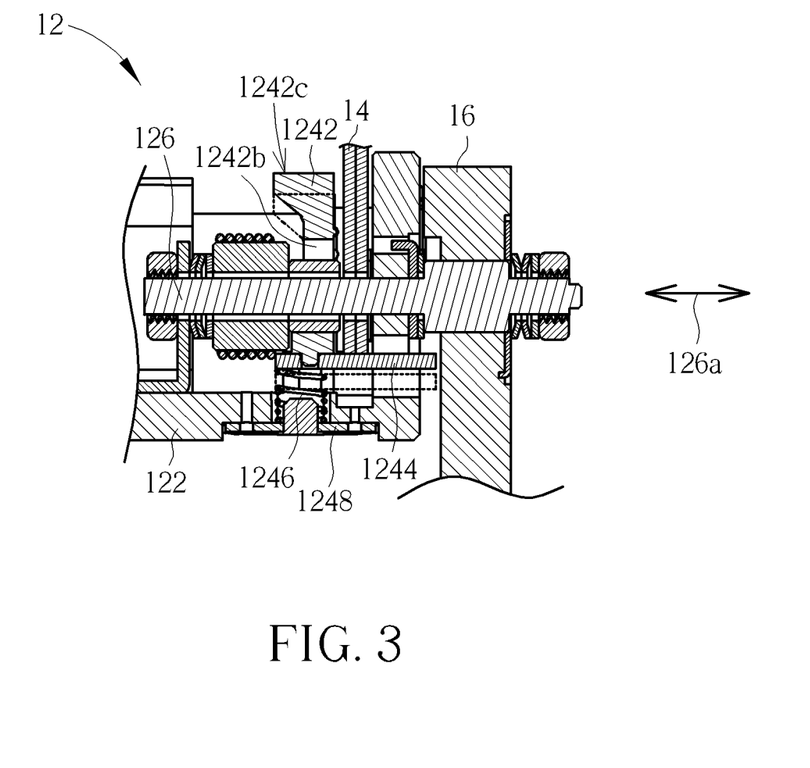
FIG. 3 is a sectional view of the pivotal connection device of the adjustable supporting device in FIG. 1.

Please also refer to FIG. 2 and FIG. 3. FIG. 2 is a partially-exploded view of the pivotal connection device 12; therein, for simple illustration, some components are combined to be shown in the figure. Furthermore, conventional components such as screws are omitted. These are also applied to the following figures and will not be repeated. FIG. 3 is a sectional view of the pivotal connection device 12. The pivotal connection device 12 includes a main body 122, two rotational restriction mechanisms 124, and two pivots 126. The rotational restriction mechanisms 124 and the pivots 126 are disposed on the main body 122 symmetrically, so only one will be illustrated hereinafter. The rotational restriction mechanism 124 includes a driving part 1242, a restricting part 1244, a resilient part 1246, and a fixing plate 1248. The restricting part 1244 and the driving part 1242 are connected so as to be move together, for example by screws, but the invention is not limited thereto. The main body 122 has a pair of guiding slots 1222. The driving part 1242 is movably disposed by its two side edges 1242a in the guiding slots 1222. In the embodiment, the side edge 1242a thereon forms a rib conducive to reduction of friction between the side edge 1242a and the guiding slot 1222. The driving part 1242 has a slot 1242b with an elliptic profile for the pivot 126 to pass through and move up and down together with the restricting part 1244 relative to the pivot 126. The driving part 1242 has a cam surface 1242c for other components to push. The fixing plate 1248 is fixed at the bottom surface of the main body 122. The resilient part 1246 (such as spring) is disposed against and between the restricting part 1244 and the fixing plate 1248, such that the resilient part 1246 keeps pushing the restricting part 1244 and the main body 122. When the driving part 1242 is pushed to move, the restricting part 1244 is driven by the driving part 1242 to move downward relative to the main body 122 and compress the resilient part 1246, as shown by dashed lines in FIG. 3. When the driving part 1242 is no longer pushed to move, the restricting part 1244 and the driving part 1242 can move upward and back to the original position by a restoring force induced by the compressed resilient part 1246. The first supporting member 14 and the second supporting member 16 are pivotally connected to the pivotal connection device 12 by the pivot 126.

Figure 4:
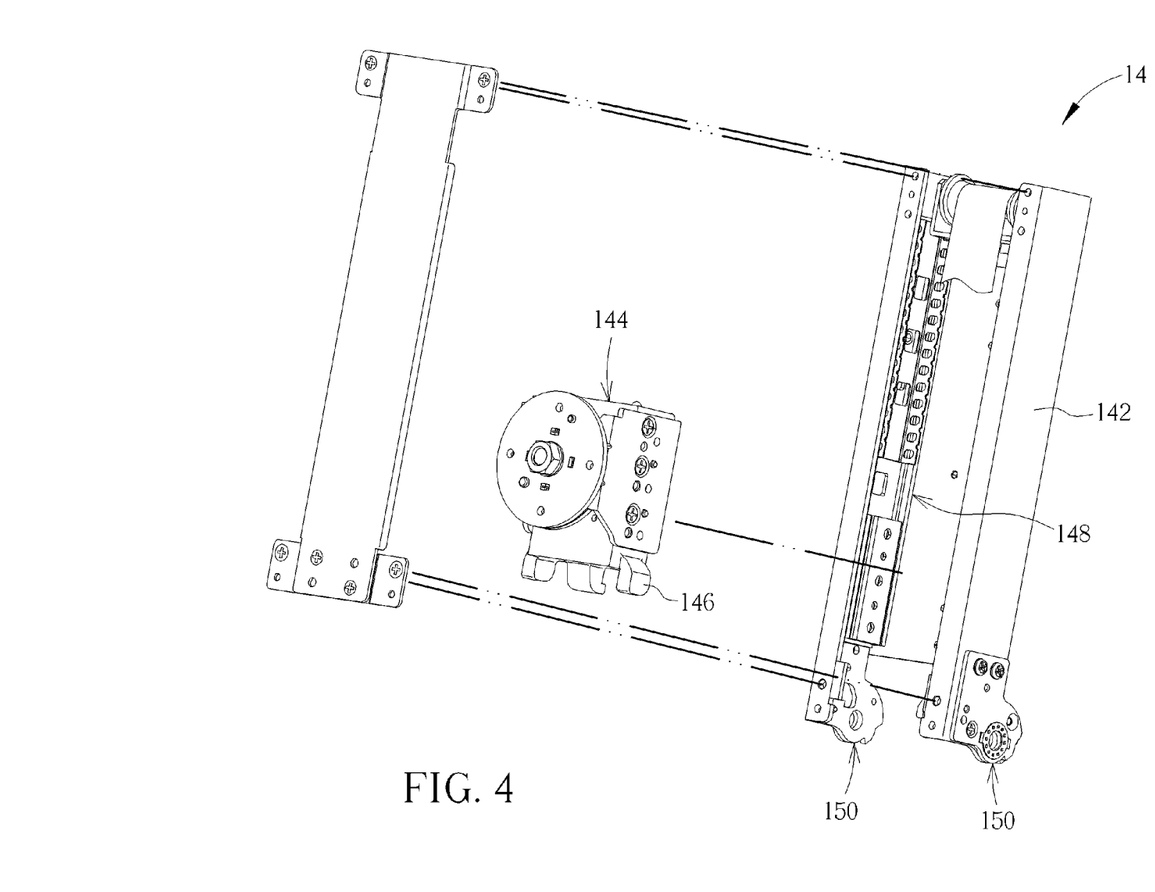
FIG. 4 is a partially-exploded view of a first supporting member of the adjustable supporting device in FIG. 1.
Figure 5:
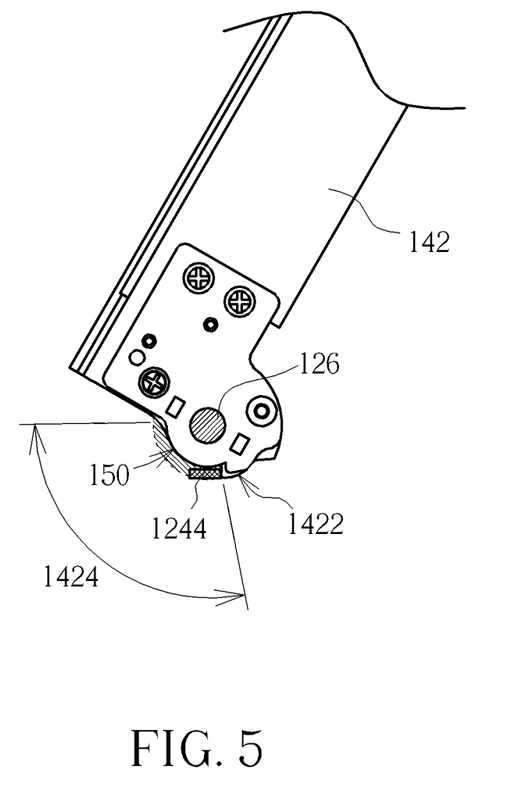
FIG. 5 is a side view of a part of the first supporting member in FIG. 4.

Please refer to FIG. 2 and FIG. 4. FIG. 4 is a partially-exploded view of the first supporting member 14. The first supporting member 14 includes a support body 142, a fixing frame 144, an actuation part 146, and a sliding mechanism 148. The support body 142 is pivotally connected to the main body 122 of the pivotal connection device 12. The fixing frame 144 is movably disposed on the support body 142 by the sliding mechanism 148 disposed on the support body 142. The fixing frame 144 is also used for fixing the object such as the monitor shown in FIG. 1, supported by the adjustable supporting device 1. The actuation part 146 is connected to the fixing frame 144. In the embodiment, the actuation part 146 is directly integrated into the structure of the fixing frame 144. The first supporting member 14 includes a first rotational restriction structure 150 corresponding to the restricting part 1244. Please also refer to FIG. 5. FIG. 5 is a side view of a part of the first supporting member 14; therein, the pivot 126 and the restricting part 1244 are shown with hatched lines. As shown by FIG. 5, the first rotational restriction structure 150 is an edge 1422 of the support body 142 of the first supporting member 14. The edge 1422 forms an arc indentation area (i.e. the dashed rectangle with hatched lines). The area is formed by the profile of the edge 1422 and forms the limitation range of the first rotational restriction structure 150. After the restricting part 1244 enters this limitation range, rotation of the first rotational restriction structure 150 relative to the pivotal connection device 12 is limited by the restricting part 1244 so as to be rotatable only within a certain relative rotation angle range. In the embodiment, the arc indentation area surrounds the pivot 126 in a central angle 1424 (about 110 degrees), but the invention is not limited thereto. It is added that the restricting part 1244 has a width (logically equivalent to an arc length relative to the pivot 126), so in practice, the allowable central angle for the restricting part 1244 to relatively move under the limitation by the first rotational restriction structure 150 is less than the central angle 1424 corresponding to the arc indentation area. For other explanations of the restricting part 1244, after entering the limitation range of the first rotational restriction structure 150, limiting rotation of the first supporting member 14 relative to the pivotal connection device 12, please refer to the following paragraphs.

Figure 6:
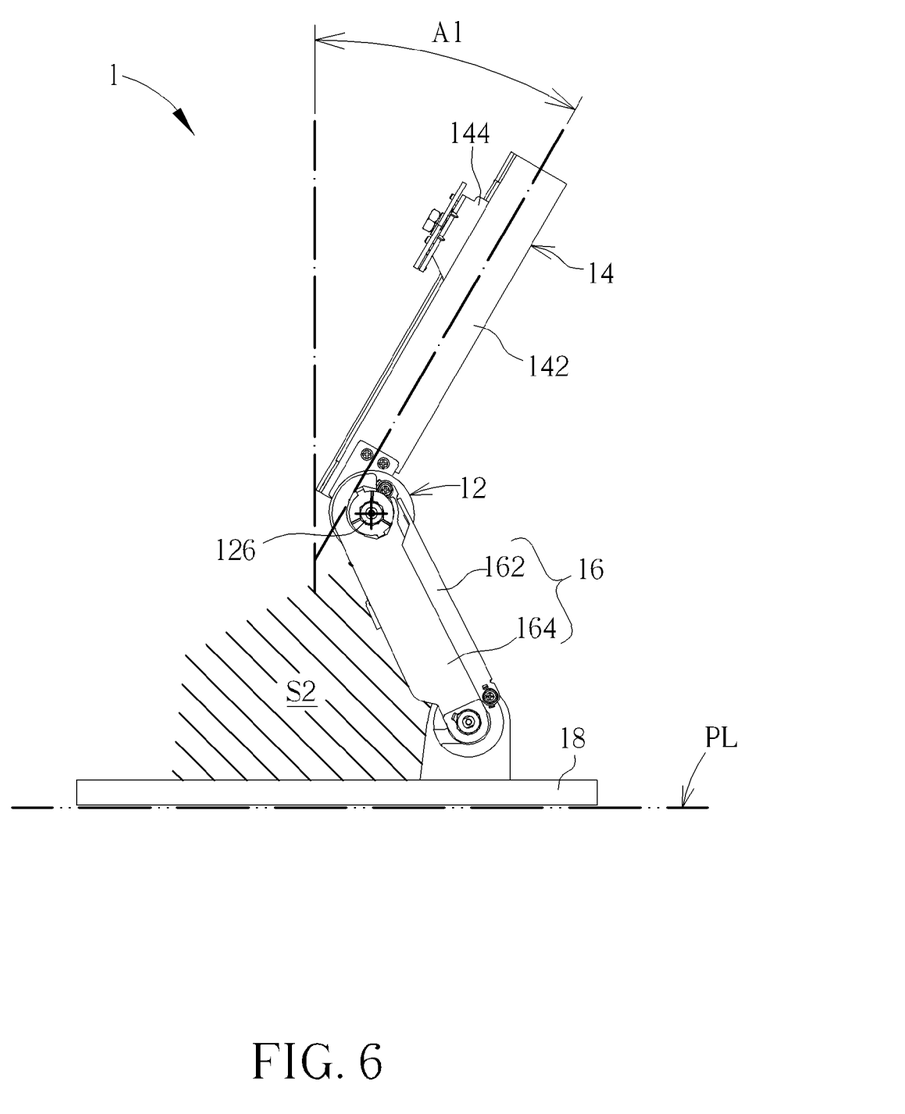
FIG. 6 is a side view of the adjustable supporting device in FIG. 1.
Figure 7:
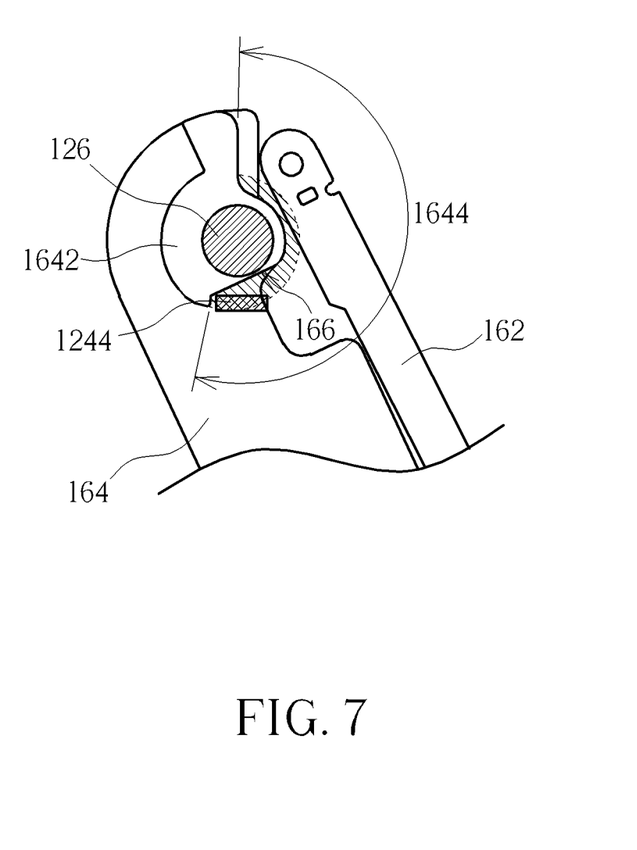
FIG. 7 is a side view of a part of a second supporting member in FIG. 2.

Please refer to FIG. 2 and FIG. 6. FIG. 6 is a side view of the adjustable supporting device 1. The second supporting member 16 includes an upper support 162 and a lower support 164, each of the both is pivotally connected to the main body 122 of the pivotal connection device 12 and the mount 18 individually, so the second supporting member 16 forms a four-bar linkage mechanism. In the embodiment, the four-bar linkage mechanism shows a parallelogram structure, so during rotating of the second supporting member 16 relative to the mount 18, the tilted angle of the first supporting member 14 can be maintained; that is, the rotation angle of the pivotal connection device 12 relative to the mount 18 is stationary. However, the invention is not limited thereto. The second supporting member 16 includes a second rotational restriction structure 166 corresponding to the restricting part 1244 and formed on the lower support 164, which is based on the fact that the lower support 164 is disposed near the restricting part 1244 in the embodiment. In practice, the second rotational restriction structure 166 can be alternatively formed on the upper support 162 as long as the second rotational restriction structure 166 can be operated in coordination with the action of the rotational restriction mechanism 124. Furthermore, please also refer to FIG. 7. FIG. 7 is a side view of a part of the second supporting member 16; therein, for clear observation on the structure of the second rotational restriction structure 166, the lower support 164 in FIG. 7 is the left lower support 164 in FIG. 2, and the pivot 126 and the restricting part 1244 are shown with hatched lines. As shown by FIG. 7, the second rotational restriction structure 166 is a protrusive blocker 1642 of the lower support 164 of the second supporting member 16. The protrusive blocker 1642 forms an arc indentation area (i.e. the dashed rectangle with hatched lines). The area is formed by the profile of the protrusive blocker 1642 and forms the limitation range of the second rotational restriction structure 166. After the restricting part 1244 enters the limitation range, rotation of the second rotational restriction structure 166 relative to the pivotal connection device 12 is limited by the restricting part 1244 so as to be rotatable only within a certain relative rotation angle range. In the embodiment, the arc indentation area surrounds the pivot 126 in a central angle 1644 (about 190 degrees), but the invention is not limited thereto. It is added that the restricting part 1244 has the width (logically equivalent to the arc length relative to the pivot 126). A portion of the upper support 162 is located in the limitation range, even impacting the lower support 164 during rotating. So in practice, the allowable central angle for the restricting part 1244 to relatively move under the limitation by the second rotational restriction structure 166 is less than the central angle 1644 corresponding to the arc indentation area. For other explanations of the restricting part 1244, after entering the limitation range of the second rotational restriction structure 166, limiting rotation of the second supporting member 16 relative to the pivotal connection device 12, please refer to the following paragraphs.

Figure 8:
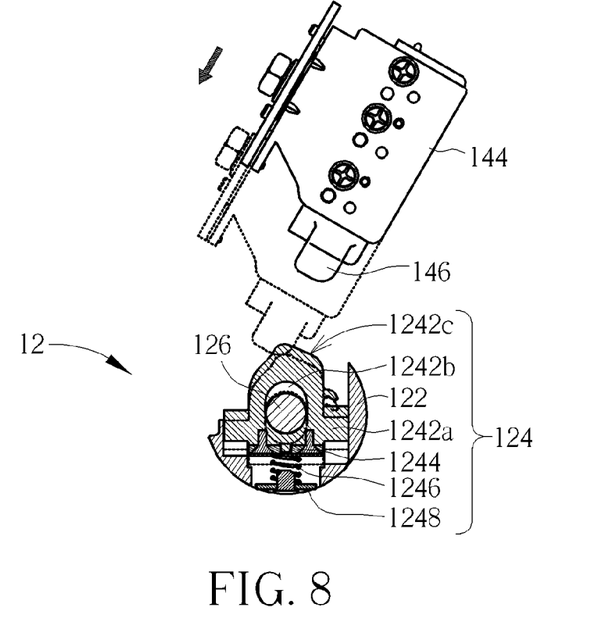
FIG. 8 is a schematic diagram illustrating an action of the pivotal connection device of the adjustable supporting device in FIG. 1.

Please refer to FIG. 3, FIG. 6 and FIG. 8. FIG. 8 is a schematic diagram illustrating an action of the rotational restriction mechanism 124 of the pivotal connection device 12 with the actuation part 146 when the adjustable supporting device 1 is under the state shown by FIG. 6. Therein, the pivotal connection device 12 is sectioned. The pivot 126 is shown by a circle section. The fixing frame 144 is shown without being sectioned, and a sliding direction of the fixing frame 144 is presented by an arrow. As shown by FIG. 6, the mount 18 is placed on a plane PL. In the embodiment, the plane PL can be the top surface of a table. In general, the plane PL can be regarded as a level plane. The first supporting member 14 extends along an extension axis (shown by chain line in FIG. 6). The extension axis is perpendicular to the rotation axis (presented by a cross mark in FIG. 6) of the pivot 126. For the adjustable supporting device 1 shown in FIG. 6, an included angle A1 between the extension axis and a vertical line (presented by a chain line in FIG. 6) perpendicular to the plane PL is 30 degrees; that is, the first supporting member 14 is tilted at 30 degrees, which defines an unlocking position of the first supporting member 14 relative to the pivotal connection device 12. In practice, the included angle A1 can be designed by request to be within a range ranging from 15 to 45 degrees. Therefore, as shown by FIG. 8, when the fixing frame 144 moves toward the pivotal connection device 12 to a trigger position, the actuation part 146 contacts and pushes the cam surface 1242c of the driving part 1242 to move the driving part 1242 such that the restricting part 1244 moves downward relative to the main body 122. That is, the restricting part 1244 moves from an entrance position P1 to a disengaged position P2 (referring to FIG. 10), so as to realize the effect of the restricting part 1244 departing from the limitation ranges of the first rotational restriction structure 150 and the second rotational restriction structure 166, which will be explained in the following paragraphs. In the embodiment, the trigger position is a dead point of the movement of the fixing frame 144 relative to the support body 142, but the invention is not limited thereto. In a practical operation, the user can hold and move the monitor downward to drive the fixing frame 144 to slide relative to the support body 142.

Figure 9:
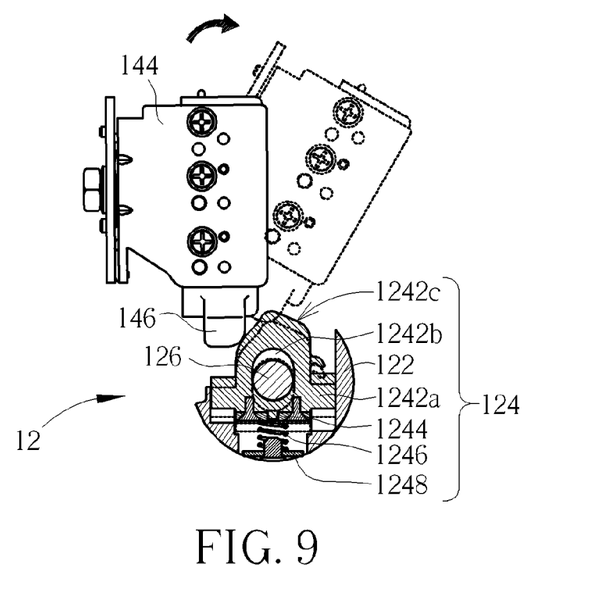
FIG. 9 is a schematic diagram illustrating another action of the pivotal connection device of the adjustable supporting device in FIG. 1.

It is added that because of the properties of the cam surface 1242c, it is unnecessary for the actuation part 146 of the embodiment to move the driving part 1242 under the condition that the first supporting member 14 is at the unlocking position. Please refer to FIG. 9, which is a schematic diagram illustrating another action of the rotational restriction mechanism 124 of the pivotal connection device 12 with the actuation part 146. As shown by FIG. 9, the fixing frame 144 is moved vertically downward to the trigger position (i.e. the dead point) so that the actuation part 146 contacts the driving part 1242; then, the fixing frame 144 (or the first supporting member 14) is rotated clockwise relative to the pivotal connection device 12, so that the actuation part 146 keeps contacting and moving the driving part 1242, which also makes the restricting part 1244 move downward relative to the main body 122. When the fixing frame 144 is rotated to the position shown by dashed lines in FIG. 9, or when the first supporting member 14 is rotated to the unlocking position (as shown by FIG. 6), the restricting part 1244 moves from the entrance position P1 to the disengaged position P2 (referring to FIG. 10), so as to realized the effect of the restricting part 1244 departing from the limitation ranges of the first rotational restriction structure 150 and the second rotational restriction structure 166, which will be explained in the following paragraphs.

Figure 10:
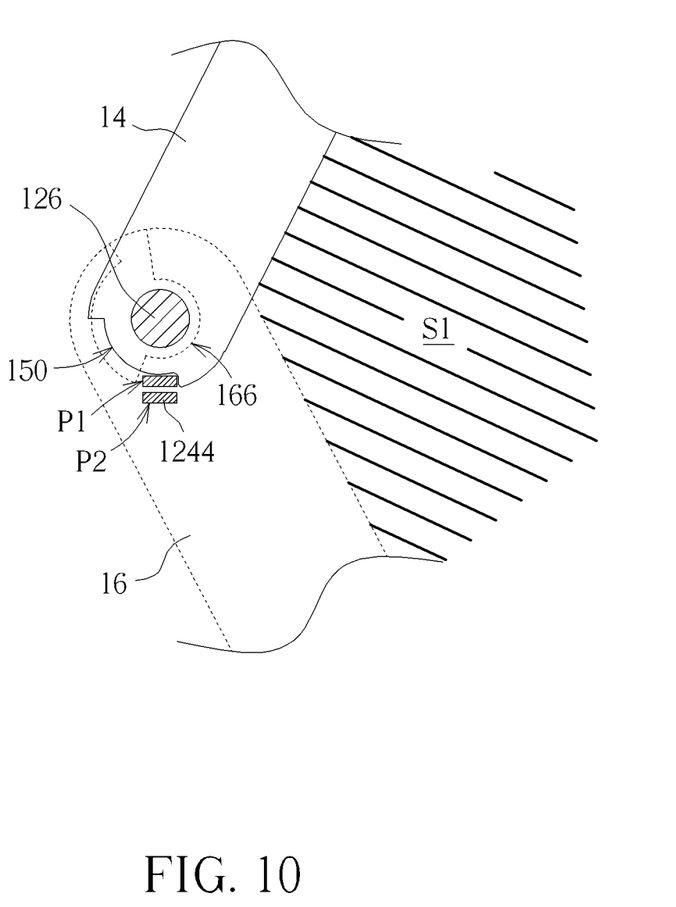
FIG. 10 is a schematic diagram illustrating an action of limiting rotating of the pivotal connection device of the adjustable supporting device in FIG. 1.

Please refer to FIG. 10, which is a schematic diagram illustrating an action of the restricting part 1244 of the rotational restriction mechanism 124 limiting the rotation of the support body 142 of the first supporting member 14 and the lower support 164 of the second supporting member 16 relative to the pivotal connection device 12; therein, the pivot 126 and the restricting part 1244 are shown by hatched lines in FIG. 10. It is added that in the embodiment, the first supporting member 14 and the second supporting member 16 are pivotally connected to the main body 122 at two opposite sides of the main body 122 respectively, but for simple illustration, the profiles of the support body 142 and the lower support 164 are shown by overlapping in FIG. 10. Therein, the profiles of the support body 142 and the first rotational restriction structure 150 formed thereon are shown by solid lines, and the profiles of the lower support 164 and the second rotational restriction structure 166 formed thereon are shown by dashed lines for distinction. In addition, the pivot 126 is shown by a circle section. Furthermore, the view direction of FIG. 10 is equivalent to that of FIG. 6. According to the abovementioned description for the positions of the actuation part 146 pushing the driving part 1242, the restricting part 1244 (shown by hatched lines in FIG. 10) has two stop positions relative to the main body 122, i.e. the entrance position P1, where the actuation part 146 does not contact the driving part 1242, and the disengaged position P2, where the first supporting member 14 is rotated toward the second supporting member 16 when the fixing frame 144 is at the dead point.

Because the first supporting member 14 and the second supporting member 16 are pivotally connected to the pivotal connection device 12 by the pivot 126, the first supporting member 14 and the second supporting member 16 are rotatable parallel to the drawing paper of FIG. 10. As shown by FIG. 10, when the restricting part 1244 enters the entrance position P1, the restricting part 1244 simultaneously enters the limitation ranges of the first rotational restriction structure 150 and the second rotational restriction structure 166. For clear illustration of the drawing, the limitation ranges are not shown by hatched lines. Please also refer to FIG. 5 and FIG. 7. The support body 142 (or the first supporting member 14) only can anticlockwise rotate relative to the pivotal connection device 12; the lower support 164 (or the second supporting member 16) only can clockwise rotate relative to the pivotal connection device 12. In other words, when the restricting part 1244 is at the entrance position P1, the rotation of the first supporting member 14 and the second supporting member 16 relative to the pivotal connection device 12 is limited and is available only within a certain rotation angle range based on the design of the first rotational restriction structure 150 and the second rotational restriction structure 166. However, the invention is not limited thereto. For example, by modifying the profiles of the first rotational restriction structure 150 and the second rotational restriction structure 166, it is possible for the restricting part 1244 to simultaneously engage with the first supporting member 14 and the second supporting member 16 such that the first supporting member 14 and the second supporting member 16 cannot rotate any more. Furthermore, by designing the relation between the first rotational restriction structure 150 and the second rotational restriction structure 166, damage to the user due to an improper rotation operation can be avoided. As shown by FIG. 10, when the restricting part 1244 is at the entrance position P1, because the first supporting member 14 and the second supporting member 16 cannot get closer by rotating, a non-action zone S1 (shown by hatched lines in FIG. 10) is always formed between the first supporting member 14 and the second supporting member 16, i.e. the space where the first supporting member 14 and the second supporting member 16 can be further folded, which can avoid the problem in the prior art that the conventional supporting members may be unexpectedly folded leading to damage to the hand or fingers of the user.

In addition, please also refer to FIG. 6. The second supporting member 16 of the embodiment is a four-bar linkage mechanism, so when the rotation of the second supporting member 16 relative to the pivotal connection device 12 is limited, the rotation of the second supporting member 16 relative to the mount 18 is also limited. Furthermore, when the second supporting member 16 cannot anticlockwise rotate relative to the pivotal connection device 12, the second supporting member 16 cannot clockwise rotate relative to the mount 18 either. Therefore, a non-action zone S2 (shown by hatched lines in FIG. 6) is always formed between the second supporting member 16 and the mount 18 (i.e. at the left side in FIG. 10), i.e. the space where the second supporting member 16 and the mount 18 can be further folded, which also can avoid the problem in the prior art that the conventional supporting members may be unexpectedly folded leading to damage to the hand or fingers of the user.

Please also refer to FIG. 10 and the abovementioned description for FIG. 8, when the restricting part 1244 is at the disengaged position P2, the restricting part 1244 departs simultaneously from the limitation ranges of the first rotational restriction structure 150 and the second rotational restriction structure 166, so that the first supporting member 14 and the second supporting member 16 can free rotate relative to the pivotal connection device 12. At this moment, the adjustable supporting device 1 can be folded completely.

Figure 11:
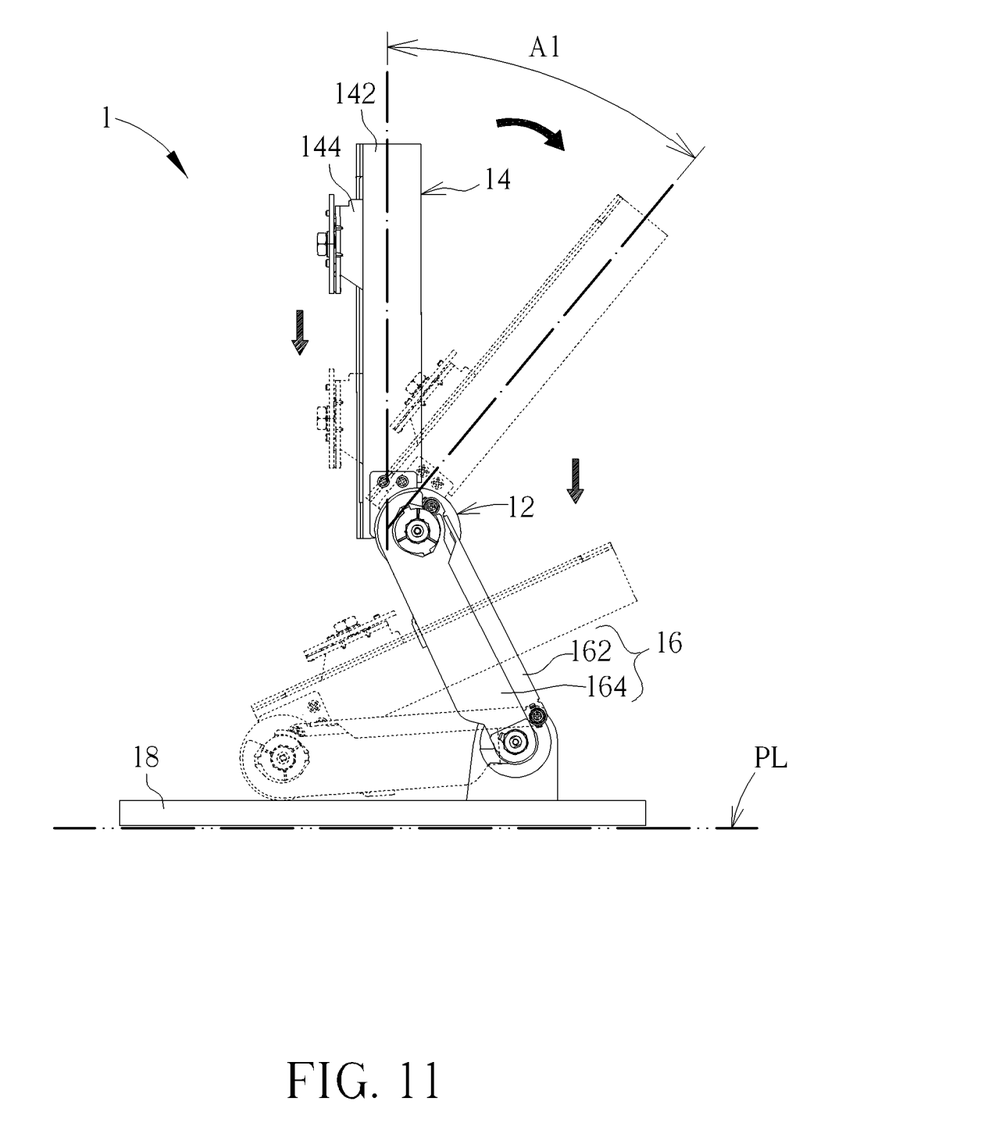
FIG. 11 is a schematic diagram illustrating an action of successively folding the adjustable supporting device in FIG. 1.
Figure 12:
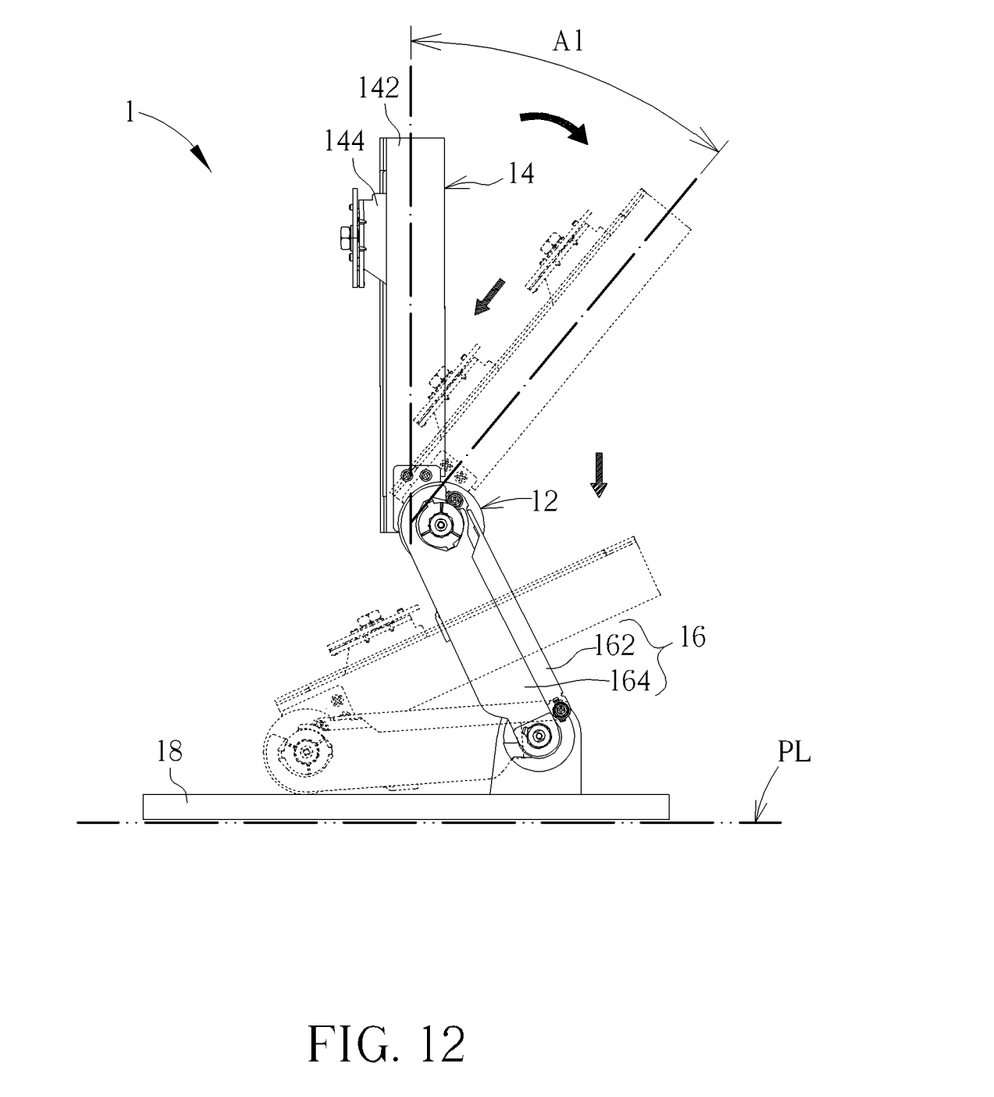
FIG. 12 is a schematic diagram illustrating another action of successively folding the adjustable supporting device in FIG. 1.

According to the abovementioned disengagement description of the rotational restriction mechanism 124, the adjustable supporting device 1 can be folded in two practical ways based on the user's custom. One way is shown by FIG. 11. When the adjustable supporting device 1 is in use, the first supporting member 14 is substantially disposed vertically, based on the product specification thereof, but the invention is not limited thereto. For folding the adjustable supporting device 1, the user can hold the monitor (not shown in FIG. 11 for clear drawing) mounted on the fixing frame 144 to move the fixing frame 144 to the trigger position. Then, the user pushes the monitor backward, i.e. to clockwise rotate the first supporting member 14 relative to the pivotal connection device 12 to the unlocking position, such that the rotational restriction mechanism 124 is unlocked. Afterward, the user pushes the monitor backward and downward till the adjustable supporting device 1 is folded completely. The other way is shown by FIG. 12. The user can push the monitor backward, i.e. to clockwise rotate the first supporting member 14 relative to the pivotal connection device 12 to the unlocking position, and then slide the fixing frame 144 downward to the trigger position, such that the rotational restriction mechanism 124 is unlocked. Similarly, the user can continue to push the monitor backward and downward till the adjustable supporting device 1 is folded completely.

It is added that in the embodiment, when the user wants to unlock the rotational restriction mechanism 124, the user needs to rotate the pivotal connection device 12 to the unlocking position (such as slanting from the vertical line at 30 degrees) relative to the pivotal connection device 12, and slide the fixing frame 144 to the trigger position (such as the dead point). Such design depends on the use specification of a practical product; the invention is not limited thereto. It is added more that in the embodiment, the actuation of the rotational restriction mechanism 124 is triggered by the actuation part 146 connected to the fixing frame 144, which is convenient for the user to trigger by moving the monitor. Furthermore, the monitor can be also disposed at a proper position, so that the adjustable supporting device 1 and the monitor both are under a predetermined folded status for convenience of storage. Such feature is applicable especially for folding by single hand. However, the invention is not limited thereto. For example, the actuation of the rotational restriction mechanism 124 can be triggered by another component, such as a button exposed out of the pivotal connection device 12. In addition, please refer to FIG. 2 and FIG. 3. The pivotal connection device 12 thereon defines a pivotal direction (i.e. the direction of the rotation axis of the pivot 126). The first supporting member 14 and the second supporting member 16 are pivotally connected to the main body 122 in the same pivotal direction 126a. The restricting part 1244 can be driven by the driving part 1242 to move relative to the main body 122 in a direction perpendicular to the pivotal direction 126a, which is conducive to mechanism simplification of the restricting part 1244 engaging with the first supporting member 14 and the second supporting member 16, but the invention is not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustable supporting device for supporting an electronic device with a monitor, comprising:
    a pivotal connection device, comprising:
        a main body; and
        a rotational restriction mechanism disposed on the main body, the rotational restriction mechanism comprising:
            a driving part;
            a restricting part connected to the driving part, the restricting part being capable of being driven by the driving part to move relative to the main body; and
            a resilient part against and between the restricting part and the main body;
    a first supporting member pivotally connected to the main body, the first supporting member comprising a first rotational restriction structure corresponding to the restricting part; and
    a second supporting member pivotally connected to the main body, the second supporting member comprising a second rotational restriction structure corresponding to the restricting part;
wherein the restricting part is capable of simultaneously entering limitation ranges of the first rotational restriction structure and the second rotational restriction structure so as to limit rotation of the first supporting member and the second supporting member relative to the pivotal connection device.

2. The adjustable supporting device of claim 1, wherein the pivotal connection device comprises a pivot, the first supporting member and the second supporting member are pivotally connected to the pivotal connection device by the pivot, the driving part comprises a slot, the pivot passes through the slot, and the driving part and the restricting part are capable of moving together relative to the pivot.

3. The adjustable supporting device of claim 2, wherein the main body has a guiding slot, and the driving part is movably disposed in the guiding slot.

4. The adjustable supporting device of claim 1, wherein the first supporting member comprises a support body, a fixing frame, and an actuation part, the support body is pivotally connected to the main body of the pivotal connection device, the fixing frame is movably disposed on the support body for fixing an object thereon, the actuation part is connected to the fixing frame, and when the fixing frame moves toward the pivotal connection device to a trigger position, the actuation part is capable of contacting the driving part.

5. The adjustable supporting device of claim 4, wherein the first supporting member comprises a sliding mechanism, and the fixing frame is movably disposed on the support body by the sliding mechanism.

6. The adjustable supporting device of claim 4, wherein when the fixing frame is located at the trigger position, during rotating of the first supporting member toward the second supporting member relative to the pivotal connection device to an unlocking position, the actuation part contacts and moves the driving part so that the restricting part moves relative to the main body to depart from the limitation ranges of the first rotational restriction structure and the second rotational restriction structure.

7. The adjustable supporting device of claim 6, further comprising a mount, the mount being capable of being placed on a plane, the second supporting member being pivotally connected to the mount such that a rotation angle of the pivotal connection device relative to the mount is fixed, the first supporting member being pivotally connected in a rotation axis to the pivotal connection device, the first supporting member extending substantially in an extension axis, the extension axis being perpendicular to the rotation axis, wherein when the first supporting member rotates to the unlocking position, an included angle between the extension axis and a vertical line perpendicular to the plane is from 15 degrees to 45 degrees.

8. The adjustable supporting device of claim 6, wherein the driving part has a cam surface, and the actuation part moves the driving part by contacting the cam surface.

9. The adjustable supporting device of claim 4, wherein when the first supporting member is located at an unlocking position relative to the pivotal connection device, the fixing frame moves toward the pivotal connection device to the trigger position so that the actuation part contacts and moves the driving part such that the restricting part moves relative to the main body to depart from the limitation ranges of the first rotational restriction structure and the second rotational restriction structure.

10. The adjustable supporting device of claim 1, further comprising a mount, the second supporting member being pivotally connected to the mount, wherein the second supporting member comprises an upper support and a lower support, each of which is pivotally connected to the pivotal connection device and the mount, the second rotational restriction structure is formed on the lower support or the upper support, and when the restricting part enters the limitation range of the second rotational restriction structure, the rotation of the second supporting member relative to the mount is limited.

11. The adjustable supporting device of claim 10, wherein when the restricting part enters the limitation range of the second rotational restriction structure, a first non-action zone is formed between the second supporting member and the mount.

12. The adjustable supporting device of claim 1, wherein when the restricting part enters the limitation ranges of the first rotational restriction structure and the second rotational restriction structure, a second non-action zone is formed between the first supporting member and the second supporting member.

13. The adjustable supporting device of claim 1, wherein the first rotational restriction structure is an edge of the first supporting member.

14. The adjustable supporting device of claim 13, wherein the first supporting member is pivotally connected to the pivotal connection device by a pivot, the edge forms an arc indentation area, and the arc indentation area surrounds the pivot.

15. The adjustable supporting device of claim 1, wherein the second rotational restriction structure is a protrusive blocker of the second supporting member.

16. The adjustable supporting device of claim 15, wherein the second supporting member is pivotally connected to the pivotal connection device by a pivot, the blocker forms an arc indentation area, and the arc indentation area surrounds the pivot.

17. The adjustable supporting device of claim 1, wherein the pivotal connection device thereon defines a pivotal direction, the first supporting member and the second supporting member are pivotally connected to the main body in the pivotal direction, and the restricting part is capable of being driven by the driving part to move relative to the main body in a direction perpendicular to the pivotal direction.

18. An adjustable supporting device for supporting an electronic device with a monitor, comprising:
    a pivotal connection device, comprising:
        a main body; and
        a rotational restriction mechanism disposed on the main body, the rotational restriction mechanism comprising:
            a driving part; and
            a restricting part connected to the driving part, the restricting part being capable of being driven by the driving part to move relative to the main body;
    a first supporting member pivotally connected to the main body, the first supporting member comprising a first rotational restriction structure corresponding to the restricting part, wherein the first supporting member comprises a support body, a fixing frame, and an actuation part, the support body is pivotally connected to the main body of the pivotal connection device, the fixing frame is movably disposed on the support body for fixing an object thereon, the actuation part is connected to the fixing frame, and when the fixing frame moves toward the pivotal connection device to a trigger position, the actuation part is capable of contacting the driving part; and
    a second supporting member pivotally connected to the main body, the second supporting member comprising a second rotational restriction structure corresponding to the restricting part;
wherein the restricting part is capable of simultaneously entering limitation ranges of the first rotational restriction structure and the second rotational restriction structure so as to limit rotation of the first supporting member and the second supporting member relative to the pivotal connection device.

19. An adjustable supporting device for supporting an electronic device with a monitor, comprising:

a pivotal connection device, comprising:
   a main body; and
   a rotational restriction mechanism disposed on the main body, the rotational restriction mechanism comprising:
      a driving part; and
      a restricting part connected to the driving part, the restricting part being capable of being driven by the driving part to move relative to the main body;
a mount;
a first supporting member pivotally connected to the main body, the first supporting member comprising a first rotational restriction structure corresponding to the restricting part; and
a second supporting member pivotally connected to the main body and the mount, the second supporting member comprising a second rotational restriction structure corresponding to the restricting part, wherein the second supporting member comprises an upper support and a lower support, each of which is pivotally connected to the pivotal connection device and the mount, the second rotational restriction structure is formed on the lower support or the upper support;
wherein the restricting part is capable of simultaneously entering limitation ranges of the first rotational restriction structure and the second rotational restriction structure so as to limit rotation of the first supporting member and the second supporting member relative to the pivotal connection device, and when the restricting part enters the limitation range of the second rotational restriction structure, the rotation of the second supporting member relative to the mount is limited.

* * * * *